United States Patent [19]
Wissmann et al.

[11] Patent Number: 5,592,975
[45] Date of Patent: Jan. 14, 1997

[54] GLIDE TUBE RING FOR TUBE-IN-TUBE SYSTEMS

[75] Inventors: Friedbert Wissmann, Bergstrasse 4, 56130 Bad Ems; Paul Kientz, Wadern; Bernd Skerra, Mössingen, all of Germany

[73] Assignees: SAAR-Gummiwerk GmbH; Friedbert Wissmann, both of Germany

[21] Appl. No.: 358,330

[22] Filed: Dec. 19, 1994

[30] Foreign Application Priority Data

Dec. 21, 1993 [DE] Germany ............ 43 43 762.1

[51] Int. Cl.⁶ .................................. F16L 9/18
[52] U.S. Cl. .................. 138/112; 138/113; 138/114; 138/148
[58] Field of Search ............ 138/112–114, 158, 138/161, 162, 148, 108, 110

[56] References Cited

U.S. PATENT DOCUMENTS

| | | | |
|---|---|---|---|
| 3,374,308 | 3/1968 | Haas | 138/113 X |
| 3,909,885 | 10/1975 | Sinko | 138/113 X |
| 4,182,378 | 1/1980 | Dieter | 138/114 X |
| 4,896,701 | 1/1990 | Young | 138/114 X |
| 5,441,082 | 8/1995 | Eskew et al. | 138/112 |
| 5,465,759 | 11/1995 | Carlson et al. | 138/110 |

*Primary Examiner*—Patrick Brinson
*Attorney, Agent, or Firm*—Dorn, McEachran, Jambor & Keating

[57] ABSTRACT

The present invention discloses a glide tube ring for tube-in-tube systems, pipe conduits and the like. The glide ring tube according to the invention is provided with axially spaced glides running parallel to each other whose material has the lowest possible friction coefficient, especially a plastic, preferably a fiberglass-reinforced polyethylene, polyamide or the like, in which the glide tube ring is attached to the central tube forming a closed ring that centers this tube in the protecting tube, pipe conduit or the like.

12 Claims, 9 Drawing Sheets

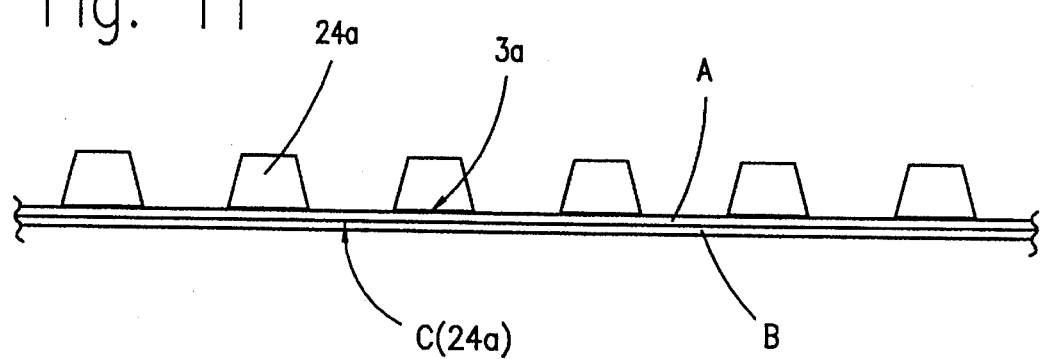
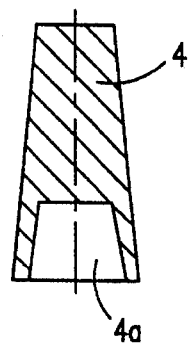 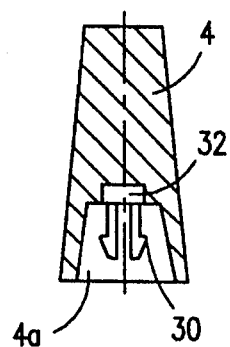

GLIDE TUBE RING FOR TUBE-IN-TUBE SYSTEMS

The invention concerns a glide tube ring for tube-in-tube systems, pipe conduits or the like. The glide tube ring according to the invention is provided on its back with axially spaced glides running parallel to each other whose material has the lowest possible friction coefficient, especially a plastic, preferably an optionally fiberglass-reinforced polyethylene, polyamide or the like, in which the glide tube ring is attached to the central tube forming a closed ring that guides/centers this tube in the protecting tube, pipe conduit or the like.

A known glide tube ring of this type is assembled, for example, from two half-shells. Each half-shell on its outside has at least one full glide and two half-glides that are designed as closure strips. The half-shells are positioned around the central tube and screwed together with screws passing through the closure strips and the corresponding nuts. The half-shells are formed and dimensioned so that they can be attached with clamping action on the central tube. A double-coated adhesive strip is often coemployed in smooth central tubes as an adhesive insert.

Glide tube rings of the aforementioned type have been successfully employed for many years. The radii of the half-shells are dimensioned here so that the glide tube ring formed in each case from two half-shells can be used with several central tube outside diameters; for example

| | |
| --- | --- |
| Nominal width 20 | Tube outside diameter of min. 29 to max. 37 mm |
| Nominal width 50 | Tube outside diameter of min. 60 to max. 67 mm |
| Nominal width 100 | Tube outside diameter of min. 106 to max. 120 mm |
| Nominal width 300 | Tube outside diameter of min. 326 to max. 350 mm |

In practice a wide variety of ridge heights are required in addition to the individual central tube outside diameters, for example 16, 24, 36, 48, 55, 70, 90, 110 mm, so that a higher cost must be incurred for production and maintenance of the corresponding injection molds. Owing to the need to cover several tube outside diameters with the same half-shell radius in conjunction with the requirement of absolute bearing capacity of the glide tube ring, it happens that the inside of the glide tube ring does not lie exactly against the outside of the tube so that thin-walled tubes in particular and tubes made of softer materials, say, plastic tubes, can be deformed in the region of the glide tube ring, which can have adverse effects.

In another known plastic glide tube the number of actually required injection molds is dealt with by constructing two segments with different radii in which the chord length of the large segment is twice as large as that of the small segment. In this fashion it is possible to cover the nominal widths of 100 to 150 (tube outside diameters of min. 98 to max. 215 mm) with a different number of small segments, whereas the large segments are used in the nominal widths of 200 to 350 (tube outside diameters min. 203 to max. 425 mm), in which case a small segment is added to the corresponding number of large segments for the nominal widths of 250, 300 and 350.

The number of required injection molds is indeed reduced in the aforementioned fashion, but the different ridge heights required in practice still invariably result in very high mold cost. Moreover, even when these tested glide tube rings are used, deformation of thin-walled or relatively soft tubes cannot always be prevented; coemployment of adhesive inserts often cannot be dispensed with either.

The segments of the aforementioned very stable plastic glide tube rings are assembled into a ring by means of screws and nuts and attached to the central tube. This is not always so simple at the construction site, especially in cold or wet weather. In addition, the presence of metal in the annular space between the central tube and protecting tube, pipe conduit or the like is not desired, especially when cathodic corrosion protection is to be guaranteed. In another known glide tube ring two segments of different size are again used, but the segments have wedge-shaped closure strips on both sides, in which the wedge members on the closure strips of two neighboring segments are abutted so that the segments are joined, closed into a ring and fastened to the central tube under tension, optionally with the aid of a clamping device and/or adhesive inserts.

Even in this glide tube ring it is often discernible that the segments do not lie against the central tube with sufficient accuracy with the already described consequences; the high cost for manufacture and maintenance of the molds could not be reduced either.

In another known plastic glide tube ring individual segments provided with meshing extensions are lined up on two tightening straps in order to be arranged around the central tube and attached to it by tightening the tightening straps via turnbuckles on the central tube. Three different segments are used here, in which several identical segments are assembled into a glide tube ring and each segment covers a defined tube outside diameter range. Relatively good fit to the outside periphery of the central tube is indeed achieved in this glide tube ring, but the cost for manufacture and maintenance of the molds rises relative to the glide tube rings already mentioned, especially since each segment must be manufactured with a number of very different ridge heights. Moreover, the stability of the glide tube ring so formed is not absolutely guaranteed, especially at larger ridge heights.

In another design of a glide tube ring three different segment types are available for assembly of the glides, in which each segment is allocated to a specific central tube diameter group. A common feature of the three segments is that they consist of a relatively thin-walled plastic so that the segments acquire high flexibility and adjust well to the outside periphery of the central tube. The individual elements are provided with teeth on the top on one end and on the bottom on the other end, by means of which the segments of the same type forming a ring can be inserted one in the other. The still open ring is placed around the central tube and closed by fitting together the two ends. Each segment connection is then tightened with a special tightening tool and the ring fastened to the central tube firmly, if necessary, with coemployment of an adhesive insert. The actual glides in this design are divided into several glide nubs arranged in sequence in the longitudinal direction of the tube, in which the nubs of one row are connected to each other by a thin ridge.

The relatively thin-walled plastic segments do produce high flexibility, but also limit the possible ridge heights. Moreover, bending of the glide nubs could be observed, especially in long tube stretches. Another drawback is that a specific tightening tool must be used for each segment type and the ring position can no longer be corrected after tightening of the segments unless one destroys the ring.

Another glide tube ring is also formed by a screwless, metal-free plug-in connection of individual segments. This differs from the glide tube ring just described in that each glide tube segment has a tongue-like bracket on one side with sawtooth-shaped grooves on its back side. The front half of the bracket penetrates a slit provided in the glide ridge of the neighboring segment, in which the segments are provided with sawtooth-shaped grooves on their top corresponding to those of the bracket. In order to form the glide tube ring the individual segments are fitted together via the brackets so that falling apart of the individual segments is prevented by barbs applied to each bracket. The open glide tube ring so formed is now placed loosely around the product tube and the individual segments are easily interlocked. Each connection point is then tightened with a special tightening tool until the glide tube ring is firmly attached to the central tube.

Whereas the previously described glide tube ring is supposed to be employable from a central tube outside diameter of 59 mm, the glide tube ring just described is only applicable from a central tube outside diameter of 130 mm. A common feature of both glide tube rings is that loosening of the glide tube ring when the ring position is incorrect is only possible by destruction of an individual segment.

Another glide tube ring that has relatively rigid, black individual segments with screwless, metal-free plug-in connection profits from the two glide tube rings just described. Each individual segment is provided with a fastening bracket on one side having two serrated slats on the top in the peripheral direction and barbs on the bottom in the region of its front limitation. The fastening bracket and the half of the individual segment form the tube support surface, whereas the other segment half is designed so that the fastening bracket can pass beneath it. The end of the individual segment that is passed underneath has a transverse opening with a number of ridges congruent to the barbs of the fastening bracket and two serrated counterslats on its bottom corresponding to the serrated slats of the fastening bracket. The individual segments joined in the aforementioned fashion are now tightened by means of a plastic flat bar. This occurs in that both the fastening bracket and the segment part that it passes beneath have slit-shaped openings on the side that are offset relative to each other. Wedge-shaped guide slats that take up the flat bar with simultaneous tightening of the individual segments run along these openings. During this tightening the barbs of the fastening brackets are firmly locked in the transverse ridges of the segment part that is passed beneath.

In contrast to the two glide tube rings just described, in this glide tube ring a tightening tool is only required for closure of the glide tube ring, since the other individual segments are already tightened by the flat bar. This could be an advantage from an installation standpoint. However, the drawback is that the last plug-in connection must take up the entire tensile stress required for firm seating of the glide tube ring on the central tube. This could mean, especially in large and heavy central tubes, that even limited tilting during insertion of the central tube into the protecting tube or pipe conduit will cause rupture of the last plug-in connection with all the consequences stemming from this. This hazard increases with an increase in glide-ridge height.

Finally, a glide tube ring that can be assembled from individual segments is known whose segments are produced without glides and provided with glides of a certain ridge height so that glide shoes with corresponding ridge height are pushed through from the inside of the segment into longitudinal openings made in it and stopped.

A reduction of mold cost can be achieved in this glide tube ring, but a drawback is that the weight of the central tube and of the medium is not taken up by a large surface, but only by the small surface of the glide shoe; this bearing surface is extremely small in hollow glide shoes.

The underlying objective of the invention is to devise a glide tube ring that is designed in one part, optionally two, three or more parts, has a very high degree of flexibility with high stability, is easy to install, contains no metal parts and in which the cost for manufacture and maintenance of the molds can be minimized. Another objective of the invention is to point out the materials from which the glide tube ring according to the invention is to be manufactured; at the same time the invention is to demonstrate the process for manufacturing the glide tube ring according to the invention and to offer information concerning the devices with which the glide tube ring according to the invention or the glide tube ring segments according to the invention are produced.

The invention accomplishes this task in a glide tube ring of the type described in the introduction in that the glide tube ring consists of an elastic, flexible, expandable, preferably recoverable, especially strip- or tire-like, rubber-elastic body, that the top of the body has a number of ribs running across its longitudinal direction arranged parallel to each other with spacing, in which the spacing of the ribs is as defined as their cross-sectional shape, height, width and length, that glide shoes with the ridge height according to requirements can be mounted on the ribs, preferably in undetachable fashion and the material of the body has a high friction coefficient, say, consists of an elastomer according to DIN 7724, for example, EPDM, SBR, NR, CR, NBR or the like, which is optionally provided with an antiscorching agent and/or an activator, if necessary, modified with carboranes.

A glide tube ring designed in this fashion is formed in one layer, two layers or several layers according to the invention, the layers consisting of a two- or multilayered glide tube ring from the same, same type of, similar or different materials are connected preferably undetachably, especially with application of heat and/or pressure, optionally with coemployment of two or more adhesion promoters, the layers have the same or different coefficient(s) of linear expansion and the layer that has the highest coefficient of expansion forms the top of the body, whereas the layer with the smallest expansion coefficient forms either the bottom of the body or the middle layer and is then the longitudinal expansion limiter of the other layers.

The ribs according to the invention preferably consist of the material of the one-layered body or, in multilayered bodies, preferably of the material of the upper layer and are molded onto the body or molded into it and form a single whole with the body. The ribs can be stiffened, for example, by embedded profile rods that preferably consist of a nonconducting material, for example, plastic, especially fiberglass-reinforced plastic, a rubber-elastic material of high Shore hardness or the like, in which the ribs preferably have a trapezoidal cross section in both the longitudinal direction of the body and across it and optionally grade into a straight-rectangular part in the upper part. Glide shoes with selectable ridge heights according to requirements can be mounted on these ribs and are preferably joinable using heat and/or pressure, optionally with coemployment of an adhesion promoter, or mechanically.

The invention also proposes that in a one-layered body its ribs are replaced by support slats that can be mounted on the top of the body and joined to it. The support slats here preferably consist of a nonconductive material, for example, a plastic that is optionally fiberglass-reinforced and/or UV-stabilized, an elastomer with particularly high Shore hardness or the like, in which the support slats are joinable to the body by a vulcanization and/or welding process, especially using heat and/or pressure, optionally with coemployment of an adhesion promoter. Here again the support slats are preferably designed trapezoidal in cross section both in the longitudinal direction of the body and across it and optionally grade into a straight, rectangular part in the upper part.

Glide shoes with selectable ridge heights can be mounted on the ribs or support slats and are permanently joinable to them mechanically or via a vulcanization and/or welding process using heat and/or pressure, optionally with coemployment of an adhesion promoter, a vulcanization accelerator, an activator or the like. For this purpose the glide shoes have a cavity on their lower part congruent in shape and size to the ribs or support slats. The glide shoes can consist, for example, of a high-density polyethylene into which coloring pigments are optionally admixed. The cavity of the glide shoe can be smaller by a selectable amount than the spatial shape of the ribs or support slats, this amount being chosen from the standpoint of the so-called memory effect of the material used to manufacture the glide shoe. The polyethylene of the glide shoe can be chemically crosslinked to improve wear resistance and the glide shoes can likewise be surface-crosslinked, especially radiation-crosslinked and consist of solid material in their upper part.

The glide shoes can also be joinable according to the invention mechanically, preferably undetachably so that one, two or more expansion anchors can be arranged in the cavity of each glide shoe, which can be pressed claw-like into the opening of the ribs or support slats. The expansion anchors arranged in the cavity of the glide shoe are either rigidly joined to the glide shoe and form a single whole with it, or are produced separately and subsequently inserted in the openings arranged in each glide shoe. For this purpose the invention proposes that the expansion anchors be either insertable with the application of heat and/or pressure, optionally with application of a coating, if necessary, with coemployment of an adhesion promoter, or in the openings of the glide shoe so that the openings arranged in the glide shoes are widened mechanically and/or with the use heat, the expansion anchors are inserted into the widened openings and fastened here with recovery of the expansion.

A glide tube ring designed in this fashion is a one-part body according to the invention that is a defined section of a body strip wound into a roll, in which the stretched, unstressed length of the section is shorter by a predetermined amount than the outside periphery of the central tube to be inserted with the glide tube ring. In this case the stretched, unstressed length of the defined section can be set at a predetermined size, allowing for the initial thickness of the body strip and limitation of its linear expansion coefficient so that the glide tube ring so formed can be applied to two, three or more central tubes of different outside diameter under tensile stress, where the tensile stress is preferably great enough so that the position of the glide tube ring on the central tube, once chosen, cannot be changed or can be changed only insignificantly during its insertion into the protecting tube, the pipe conduit or the like.

According to another characteristic of the invention the glide tube ring is designed in two or more parts and can be assembled from two or more body segments, where the body segment is another defined section of the body strip wound into a roll and its stretched, unstressed length is shorter by a predetermined amount than the outside peripheral part of the central tube to be inserted with the two- or multipart glide tube ring corresponding to the section. In this case the stretched, unstressed length of the body segment can be set at a predetermined value, allowing for the initial thickness of the body strip and limitation of its linear expansion coefficient so that the glide tube ring assembled from two or more body segments can be applied to two, three or more central tubes of different outside diameter and the tensile stress is preferably great enough so that the position of the glide tube ring on the central tube, once chosen, cannot be changed or can be changed only insignificantly so during its insertion into the protecting tube, pipe conduit or the like.

According to another characteristic of the invention closures can be allocated to the two ends of the one-part body, as well as to the two ends of each body segment, and joined to them, preferably by heat and/or pressure, optionally with coemployment of an adhesion promoter. The closures that can be allocated to the body or body segments can be slats having lugs provided with eyes, which are designed so that the lugs of neighboring slats interlock and, lying outside of the support surface of the central tube in the installed state, can be penetrated by a rod, joining the bodies into a closed glide tube ring or joining the body segments forming a two- or multipart glide tube ring, so that sleeves that stiffen the lugs, optionally forming eyes, are embedded in the lugs, preferably consisting of a nonconducting, especially high-strength material, whereas the lugs and slats are formed either from the material of the body or consist of a plastic, preferably a fiberglass-reinforced polyethylene, polyamide or the like.

According to another variant of the invention the closures are screw slats provided with openings, formed so that in the installed state they lie outside of the support surface of the central tube and the openings of the screw slats can be penetrated by screws that join the body into a closed glide tube ring or join the body segments that form a two- or multipart glide tube ring. It is also prescribed that the closures are wedged slats that can mesh with wedges formed so that in the installed state, lying outside of the support surface of the central tube, they can be wedged by means of two facing wedges that join the body into a closed glide tube ring or join the body segments that form a two- or multipart glide tube ring. The back side of the closure made of plastic can be allocated to a support surface that consists, for example, of the material of the body and can be joined to the closures, especially with application of heat and/or pressure, optionally with coemployment of an adhesion promoter, and that the closures provided with the support surface can be joined to the ends of the one-part body or those of the body segments by a vulcanization process or a welding process, if necessary, with reuse of heat and/or pressure, optionally with coemployment of an adhesion promoter.

According to the invention the glide shoes can also consist of a high-density polyethylene (HDPE), a polyethylene terephthalate (PETP), a polybutylene terephthalate (PBTP) or the like, a polyester based on ethylene glycol and 2,6-naphthalenecarboxylic acid, a polyarylate based on, for example, diphenols and aromatic dicarboxylic acids or a polyester based on a 3-hydroxybenzoic acid as homogeneous monomer.

It is prescribed according to another characteristic of the invention that the Shore hardness of the ribs deviates from that of the one-layered body or from that of the upper layer of the two- or multilayered body, where the Shore hardness of the ribs is preferably greater.

The body can also consist of a thermoplastic, for example, PVC, EVA or the like, which has sufficient rubber elasticity and a high friction coefficient.

The invention also points out that the body can also consist of a thermoplastic elastomer, for example, a TPO, SBS, SEBS or the like, which has sufficient rubber elasticity and a high friction coefficient. For example, the thermoplastic elastomer can be plasticized and mixed, then molded, vulcanized and tempered with addition of fillers, acid acceptors, vulcanization accelerators, vulcanizers, optionally with coemployment of activators.

It is also prescribed that the body preferably consists of a natural rubber, in which the strip-like or tire-like, endless body can be provided on one side with a coating that can be made reactive so that a vulcanization process and/or a welding process can be initiated in it by controlled application of heat and/or pressure, through which it is joinable to both the body and to the support slats undetachably applied to it into a rollable unit. For this purpose the body of defined width can be laminated with the coating either over its entire surface, partially or in strips, optionally in the fashion of a herringbone pattern, a diamond pattern or the like.

In a two- or multilayered body the coating according to the invention can be arranged between the layers and especially is undetachably joinable to them, preferably with application of heat and/or pressure.

The back side of the closure can also be laminated with the coating in such a way that a partial reaction can be initiated in the coating by controllable application of heat and/or pressure, through which the coating can be made to adhere to the bottom of the closure, preferably undetachably. The closures can now be placed on the two ends of a one-part glide tube ring or on the ends of each body segment of a two- or multipart glide tube ring, whereupon a final reaction can be initiated in the coating by controlled application of renewed heat and/or pressure, through which the closures are joinable undetachably to the coating and this is joinable undetachably to the ends of the one-part glide tube ring or the ends of each body segment of a two- or multipart glide tube ring.

The coating according to the invention can also be applied to the expansion anchor and a partial reaction initiated in it by controlled application of heat and/or pressure, through which it is undetachably fixed to the expansion anchor, in which case after insertion of the expansion anchor provided with the coating into the openings of the glide shoe the residual reaction can be initiated in the coating with renewed controlled application of heat and/or pressure, through which the expansion anchors are undetachably joined to the coating and the coating joined to the walls of the openings of the glide shoe.

According to a process characteristic, a one-part glide tube ring having a single closure can be produced by incorporating ribs or support slats of defined size and shape at a defined parallel spacing, optionally with stiffening by incorporation of appropriately shaped profile rods or the like across its longitudinal direction by molding them into, onto or joining them on one side in an endless, elastic, flexible, stretchable, especially recoverable, strip-like or tire-like, rubber-elastic body of defined width formed in one, two or several layers. The body provided with ribs or support slats is wound into a roll for storage purposes and partial lengths or sections are unwound from this as required and cut off, the length of which is shorter by a predetermined value than the outside periphery of the central tube being inserted with the glide tube rings. The partial lengths or sections are then fashioned into one-part, open glide tube strips by providing the two ends of the section with congruent closure slats and joined to them undetachably, especially by means of a vulcanization or welding process. Plastic glide shoes with the required ridge height are then mounted on the ribs or support slats of the one-part glide tube strips and joined to them, preferably undetachably, especially by means of a vulcanization or welding process, optionally mechanically. The one-part, open glide tube strips so produced are placed around the central tube at predetermined points and formed into a one-part glide tube ring having a single closure so that the closure slats are converted into single closures with application of a tensile stress by means of a rod or by means of two screws with the corresponding nuts or by means of two wedges.

According to another process characteristic, a two-, three- or multipart glide tube ring having two, three or more closures can be produced by incorporating ribs or support slats of defined size and shape in a defined parallel spacing, optionally with stiffening by incorporation of appropriately shaped profile rods or the like, by molding them into, onto or joining them on one side across its longitudinal direction in an endless, elastic, flexible, stretchable, especially recoverable, strip-like or tire-like, rubber-elastic body of defined width formed in one, two or several layers. The bodies provided with ribs or support slats are wound into a roll for storage purposes and a number of partial lengths or sections corresponding to the required ring parts are unwound from this and cut off, the length of which is shorter by a predetermined value than the corresponding outside partial periphery of the central tube being inserted with the glide tube rings. The partial lengths or sections are then fashioned into glide tube segments by providing the two ends of each section with congruent closure slats and joining the ends to these, preferably undetachably, by means of a vulcanization or welding process. Plastic glide shoes with the required ridge height are then mounted on the ribs or support slats and joined to them, preferably undetachably, especially by means of a vulcanization or welding process, optionally mechanically. The glide tube segments so fabricated are then assembled at the construction site to open glide tube segment strips by connecting the closures of neighboring glide tube segments together with a rod, two screws with the corresponding nuts or two wedges. The glide tube segment strips so formed are then placed around the central tube at predetermined sites and formed into multipart glide tube rings having several closures by converting the last two closure slats of each segment strip to a closure with application of tensile stress by means of a rod or by means of two screws with the corresponding nuts or by means of two wedges.

Another process characteristic states that an endless, elastic, flexible, stretchable, especially recoverable, rubber-elastic body of defined width is heated and ribs running parallel to each other with defined spacing are formed on its back side across its longitudinal direction, that the material of the body is either accumulated on the sites of the body prescribed for rib production, especially by application of pressure, optionally with additional heat supply, compressed, and the desired rib shape and size are formed accordingly, or the body is creased across its longitudinal direction at defined spacing, profile rods, especially those made from a nonconducting material, are optionally inserted in these creases and the creases are sealed, preferably with repeated heat supply and pressure, optionally with coemployment of an adhesion promoter, and the profile rod incorporated by vulcanization. The body so equipped with ribs is wound into a roll for storage purposes, from which a defined section is cut off as required for a one-part glide tube ting or two or more defined other sections are cut off for a two- or multipart glide tube ring. The ribs of the section are now preferably heated and glide shoes with the required ridge height are mounted on these and joined undetachably to the ribs with application of pressure and possibly renewed heat supply, optionally with coemployment of an adhesion promoter. Each end of the section is then provided with a closure by mounting the closures with their bottom on the top of the ends of the section and joined together undetachably, preferably under pressure and possibly renewed heat supply, optionally with coemployment of an adhesion promoter, during which a reactive coating is applied beforehand to the bottom of the closure, especially using heat and/or pressure, optionally with coemployment of an adhesion promoter, and then either the one-part body so formed is placed around the central tube and the body closed via the two closures by means of a rod, two screws with corresponding nuts or by means of two wedges into a one-part glide tube ring and attached to the central tube under tensile stress, or the body segments provided with closures are joined by means of a rod, two screws with corresponding nuts or two wedges and formed into an open segment strip, this is placed around the central tube and the two- or multipart glide tube ring is formed on making the last connection and fastened to the central tube under tensile stress.

The invention states according to another process characteristic that an endless, elastic, flexible, stretchable, especially recoverable, rubber-elastic body of defined width is unwound from a supply roll and fed to a calender, that the body is heated on the top on its way to the calender and provided with an adhesion promoter, a vulcanization accelerator, an activator or the like and profile rods are fastened to the so prepared surface at a defined parallel spacing from each other across the longitudinal direction of the body. In the meantime another endless, elastic, flexible, stretchable, especially recoverable, rubber-elastic body of defined width is unwound from another supply roll and also fed to the calender, during this process the second body is preferably also heated on its bottom on its way to the calender and optionally treated with an adhesion promoter, a vulcanization accelerator, an activator or the like, that the bodies so prepared are brought together in the calender and both bodies are joined together with inclusion of the profile rods attached to the bodies with application of pressure and optionally renewed heat supply in such a way that an endless, elastic, flexible, stretchable, especially recoverable, rubber-elastic, two-layered body provided with stiffened ribs is obtained, which is wound onto a roll for storage purposes, from which a defined section is unwound and cut off as required for a one-part glide tube ring or two or more other sections are cut off for a two- or multipart glide tube ring. The ribs of the section are preferably heated and glide shoes with the required ridge height are mounted on them with application of pressure and possibly renewed heat supply, optionally with coemployment of an adhesion promoter, during which process the ends of the section are then each provided with a closure, the closures are mounted with their bottom on the top of the ends of the section and joined together, preferably under pressure and possibly renewed heat supply, optionally with coemployment of an adhesion promoter, especially undetachably, and, if necessary, a reactive coating is joined to the bottom of the closure, especially using heat and/or pressure, optionally with coemployment of an adhesion promoter. In this case either the one-part body so formed is positioned around the central tube and the body closed via the two closures by means of a rod, two screws with corresponding nuts or by means of two wedges into a glide tube ring and attached to the central tube under tensile stress, or the body segments provided with closures are each joined by means of a rod, two screws with corresponding nuts or two wedges into an open segment strip, which is placed around the central tube, and the two- or multipart glide tube ring is formed on making the last connection and attached to the central tube under tensile stress.

An essential characteristic of the invention here is that both the stiffened and unstiffened ribs are formed so that on conclusion of the vulcanization process a unified whole is formed with both the one-layered and the two- or multilayered bodies. For this purpose heat supply and/or pressure is controlled in a one-layered body in the region of the stiffening ribs on the side of the body facing away from the ribs in variable fashion so that a higher degree of plasticization of the body material is partially established and melting of the material occurs in the region of original formation of the creases so that a homogeneous, uniform whole is also achieved in the region of the original creases and the side of the body facing away from the ribs forms a closed surface.

The ribs are formed either over the entire defined width of the body or the length of the ribs and/or profile rods is limited so that defined guide edges are obtained on both long edges of the body by means of which the body is fed in controlled fashion to the calender and controllably advanced through this.

Profile rods whose cross-sectional shape is congruent to the desired cross-sectional shape of the ribs are used for stiffening of the ribs, during which heat supply and pressure on the side of the body facing the ribs is controlled so that a higher degree of plasticization of the body material is achieved in the region of rib formation.

In a multilayered body an additional layer is arranged according to the invention between two layers as a central layer and this is joined to the other layers with application of heat and/or pressure, optionally with coemployment of an adhesion promoter, a vulcanization accelerator and/or an activator, in which process the central layer is given a linear expansion coefficient that limits the possible linear expansion of the other layers to 10 to 90%, preferably 25 to 70%. Dispensing with incorporation of the middle layer by vulcanization, this can also be vulcanized or welded onto the lower layer. It is also prescribed that the layers be joined simultaneously with formation of ribs and that the linear expansion coefficient of the one-, two- or multilayered body be defined as a function of the corresponding Shore hardness.

According to the invention the ribs are preferably replaced in a one-layered body with support slats, on which the support slats are mounted at a parallel, defined spacing on the top of the body and joined to it. The support slats are preferably formed from a nonconducting material, for example, from a plastic that is optionally fiberglass-reinforced and/or UV-stabilized, an elastomer with particularly high Shore hardness or the like, placed on the top of the body and joined to it by a vulcanization and/or welding process, especially with application of heat and/or pressure, optionally with coemployment of an adhesion promoter, a vulcanization accelerator, an activator or the like.

In addition, the invention proposes that the ribs or support slats be formed preferably trapezoidal both in the longitudinal direction of the body and across it, the trapezoidal cross section optionally grading into a straight, rectangular part in its upper part, that the glide shoe be provided in its lower part with a cavity that corresponds in shape and size to the ribs or support slats and that the glide shoe so formed be mounted with its cavities on the ribs or support slats and joined to them, preferably undetachably, the glide shoe being joined to the ribs or support slats preferably with application of heat and/or pressure, optionally with coemployment of an adhesion promoter, a vulcanization accelerator, an activator or the like.

The glide shoe is formed according to the invention, for example, from an optionally fiberglass-reinforced, if necessary, UV-stabilized polyethylene, in which the cavity of the glide shoe is made smaller by a predetermined amount than the ribs or support slats, the cavity of the glide shoe is then heated so that it acquires the shape and size of the ribs or support slats, preferably becomes larger by a defined amount and the glide shoe so treated is mounted with its cavity on the ribs or support slats and fastened or shrunk onto the ribs or support slats by restoring the heat-produced elongation of the cavity to its original value.

According to another process the invention proposes that the glide shoe be mechanically joined to the ribs or support slats. For this purpose the ribs or support slats are provided with one, two or more openings, a corresponding number of expansion anchors is arranged in the cavity of each glide shoe and the expansion anchors are pressed or driven into the openings so that they are engaged claw-like in the walls of the openings, preferably undetachably. The expansion anchors are formed during production of the glide shoe simultaneously with formation of the cavities in them, so that they form a single whole with the glide shoe.

According to another embodiment, openings are made in the cavities of the glide shoe whose shape and cross-sectional size correspond to the shape of the expansion anchor, in which process the expansion anchor is produced separately and inserted, preferably undetachably, into the openings of the glide shoe so that the expansion anchor is fastened in the openings with application of heat and/or pressure, optionally with application of a coating beforehand onto the corresponding part of the expansion anchor shaft, if necessary with coemployment of an adhesion promoter, or the openings are expanded mechanically and/or with application of heat and the expansion anchors are shrunk into the openings with recovery of the expansion.

It is also proposed that the glide shoe be made, for example, from a high-density polyethylene, a coloring pigment be optionally admixed with this and the glide shoe preferably in its upper region be formed from a solid material, in which process the glide shoes in their upper region are given a cross-sectional shape that corresponds in particular to a circular arc section and that the polyethylene be either chemically crosslinked in known fashion beforehand or subsequently surface-crosslinked, especially radiation-crosslinked, to improve its wear resistance.

It is also prescribed that a crude rubber blend consisting of natural rubber, fillers, accelerators and vulcanizers be formed and vulcanized, optionally with coemployment of activators, into an endless, elastic, flexible, stretchable, preferably recoverable, especially strip-like or tire-like body having ribs on one side of defined number, shape, size and arrangement and that the body so formed be wound into a roll (7) for storage purposes.

It is also possible according to the invention to produce the body from a thermoplastic, for example, from PVC, EVA or the like, which is given sufficient rubber elasticity and a high friction coefficient.

It is also proposed according to the invention that the body be produced from a thermoplastic elastomer, for example, a TPO, SBS, SEBS or the like, and that carboranes or other products that increase temperature resistance, as well as an antiscorching agent, optionally be added. It is also proposed that the body be laminated on one side, especially on its top, with a coating that is kept reactive so that a vulcanization and/or welding process is initiated in it by controlled application of heat and/or pressure and that the coating be joined undetachably into a windable unit in this fashion both to the body and to the support slats mounted on it. It is proposed here that the endless body of defined width be laminated with the coating over its entire surface, partially or in strips, optionally in the fashion of a herringbone pattern, a diamond pattern or the like.

The invention also proposes that the back side of the closures be laminated with the coating under controllable application of heat and/or pressure by initiating a partial reaction in the coating that is sufficient to cause the coating to adhere undetachably to the back side of the closure and that the closures so provided with the coating be stored for later fabrication of the one-, two-, three- or multipart glide tube ring.

It is proposed according to another process that a number of sections be unwound and cut off from the stored roll as prefabrication for production of one-part glide tube rings, that a closure provided with the coating be mounted on the two ends of each section, and that the residual reaction be initiated in the coating by controllable application of heat and pressure, the closures joined undetachably to the coating and this undetachably to the section and that the fabricated, one-part bodies be stockpiled.

It is also proposed that for production of two-, three- or multipart glide tube rings as prefabrication a number of sections, each of which is a body segment, be unwound from a stored roll and cut off, that a closure provided with the coating be mounted on each end of a body segment and that the residual reaction be initiated in the coating by controllable application of heat and pressure, the closure joined undetachably to the coating and this undetachably to the ends of the body segments (2a) and that the so fabricated body segment be stockpiled.

Another process characteristics demonstrates that an endless, elastic, flexible, stretchable, especially recoverable, strip-like or tire-like, rubber-elastic body (1) of defined width is unwound from a supply roll (27a) and fed to a calender (28) or the like, that a coating (24a) is unwound from another supply roll (27c) and also fed to the calender (28) or the like, that the top of the body (1) and/or the back side of the coating (24a) is heated and/or provided with an adhesion promoter, a vulcanization accelerator, an activator or the like on the way to calender (28) or the like, that the coating (24a) is laminated between rolls (28a, 28b) of calender (28) over the entire surface, partially or in the fashion of a herringbone pattern, a diamond pattern or the like, preferably with application of pressure, if necessary, with renewed heat supply, onto the surface of body (1), especially undetachably, that support slats (3a) are arranged on the coating (24a) laminated onto body (1) at a parallel, defined spacing from each other and these are joined, for example, in a pressing device (33) or the like, optionally with renewed heat supply, with application of pressure, especially undetachably, to coating (24a) and the body (1) provided in this fashion with support slats (3a) is wound onto a roll (7) as an endless body strip (8) for storage purposes.

According to another process characteristic it is obvious that an endless, elastic, flexible, stretchable, especially recoverable, strip-like or tire-like, rubber-elastic body (1) of defined width is unwound from a supply roll (27a) and fed to a calender (28) or the like, that a coating (24a) is unwound from another supply roll (27c) and also fed to the calender (28) or the like, that the top of the body (1) and/or the back side of the coating (24a) is heated and/or provided with an adhesion promoter, a vulcanization accelerator, an activator or the like on the way to calender (28) or the like, that the coating (24a) is laminated between rolls (28a, 28b) of the calender (28), especially undetachably, onto the surface of body (1) over its entire surface, partially or in the fashion of a herringbone pattern, a diamond pattern or the like, preferably with application of pressure, if necessary with renewed heat supply, that profile rods (5) are arranged in a parallel, defined spacing from each other on the coating (24a) laminated onto body (1), that another elastic, flexible, stretchable, especially recoverable, strip-like or-tire-like, rubber-elastic body (2) is unwound from another supply roll (27b), heated on its back side and/or provided with an adhesion promoter, a vulcanization accelerator, an activator or the like and introduced together with the body (1) provided with coating (24a) and profile rods (5) into a pressing device (33) or the like and that both bodies (1, 2) are joined into a preferably undetachable unit with inclusion of the profile rods (5) via coating (24a) with application of pressure and optionally renewed heat supply and the two- or three-layered body (½) so formed is wound into a roll (7a) for storage purposes.

Additional embodiments of the invention can be gleaned from the patent claims and the description of the drawings:

BRIEF DESCRIPTION OF THE DRAWINGS

FIG. 11 is a detail side elevation view of a composite strip used to construct glide tube rings according to the invention;

FIG. 12a is a sectional view of a guide shoe for use in the invention;

FIG. 12b is a sectional view like FIG. 12a but showing a different guide shoe construction.

DESCRIPTION OF THE PREFERRED EMBODIMENTS

Figure 1:
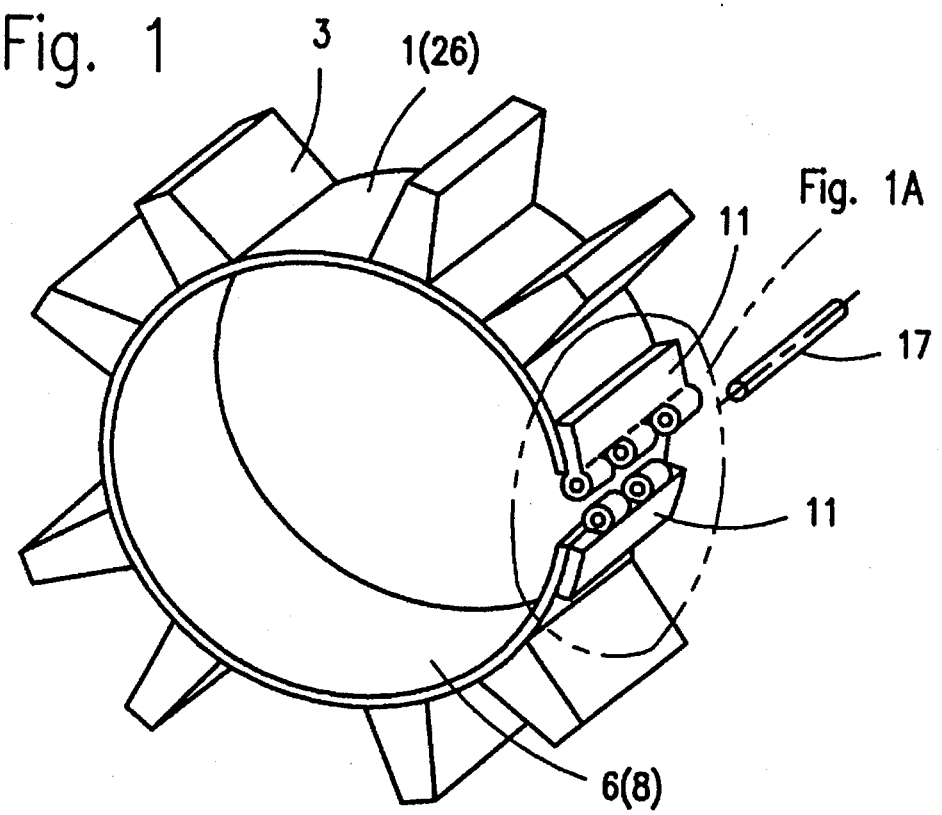
FIG. 1 is a perspective view of a glide tube ring according to one embodiment of the invention.
Figure 1A:
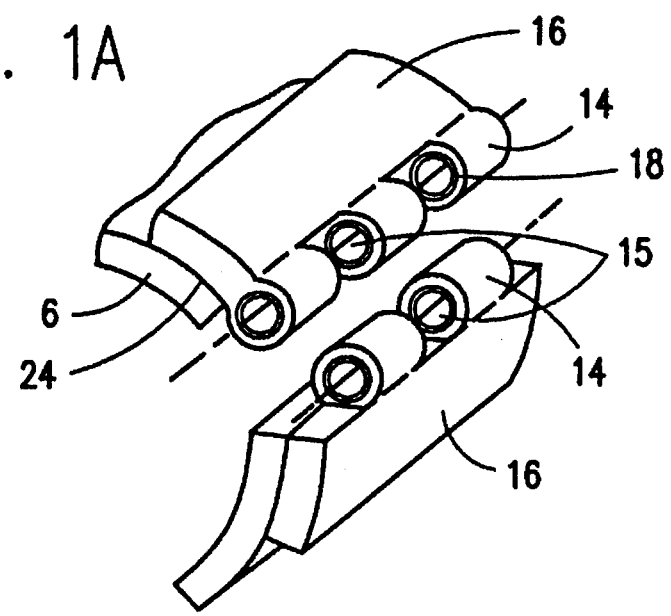
FIG. 1A is a perspective view, on an enlarged scale, of a part of the glide tube ring as generally indicated by the phantom circle 1A in FIG. 1.

FIG. 1 shows a one-part glide tube ring 1 (26) provided with a number of ribs 3, which is a defined section 6 of an elastic, flexible, stretchable, preferably recoverable, especially strip-like or tire-like, rubber-elastic body strip 8 wound into a roll 7, whose stretched, unstressed length is shorter by a predetermined amount than the outside periphery of the central tube 9 to be inserted with a glide tube ring. Both ends of section 6 are provided with a closures 11, to which each closure 11 is joined, especially undetachably, to the body 1 with application of heat and/or pressure, optionally with coemployment of an adhesion promoter. The congruent closures 11 have a slat 16 with lugs 14 formed on it, which are provided with eyes 15 penetrated by a rod 17 to form the single closure; in this case the eyes 15 of lugs 14 can be reinforced by sleeves 18. The back side of slat 16 can be laminated with a coating 24 that is joined, preferably undetachably, to slat 16 by means of a vulcanization and/or welding process. Lamination occurs according to the invention preferably with application of heat and/or pressure, optionally with coemployment of an adhesion promoter, a vulcanization accelerator, an activator or the like.

The ribs 3 in this rubber-elastic body 1 or glide tube strip 26 consist of the material of the body, are molded onto it or into it and form a uniform whole with body 1. Glide shoes 4 with the required ridge height H are mounted on these ribs 3, as is apparent from FIG. 3.

Figure 2:
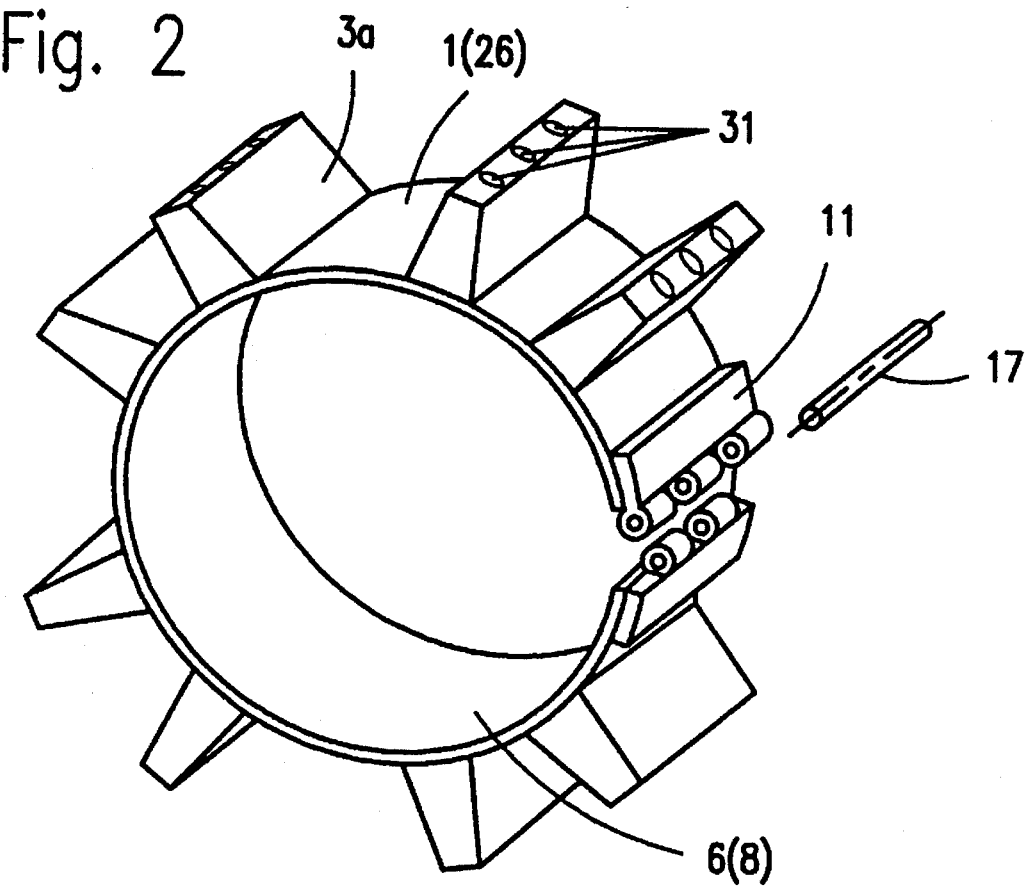
FIG. 2 is a perspective view of a glide tube ring, like FIG. 1 but illustrating a modified construction.

FIG. 2 shows the section 6 of a rubber-elastic body strip 8 that forms a one-part body 1 forming a one-part glide tube ring which has a single closure in conjunction with the two closures 11 and the rod 17 belonging to them. Dispensing with ribs 3, support slats 3a are applied to this body 1 and joined, preferably undetachably, to the body, especially with application of heat and/or pressure, optionally with coemployment of an adhesion promoter, a vulcanization accelerator, an activator or the like. The support slats 3a are formed so that they represent either glides with the smallest possible ridge height H, or glide shoes 4 with the required ridge height H are mountable on them (FIG. 3).

The glide tube strip 26 formed from the one-part body 1 or the defined section 6 is placed around central tube 9 at the construction site and closed into a glide tube ring and attached to the central tube preferably under tensile stress by passing a rod 17 through the eyes 15 of lugs 14; the rod 17 forms a hinge closure together with eyes 15 and lugs 14. The rod 17 consists of a-high-strength material, preferably a nonconducting material; for example, it can consist of a plastic, preferably a fiberglass-reinforced, optionally UV-stabilized plastic, and can also be manufactured from a rigid carbon fiber or the like.

In the one-part glide tube ring of FIGS. 1 and 2 the stretched, unstressed length $L_1$ of body 1 or of defined section 6 of body strip 8 is shorter by a predetermined amount X than the periphery of the central tube 9 to be inserted with the glide tube ring, thus value X can be predetermined as a function of the initial thickness D and linear expansion coefficient of body strip 8. The value X is preferably chosen so that the one-part glide tube ring can be applied to two, three or more central tubes of different diameter under tensile stress, in which the tensile stress is preferably great enough that the position of the glide tube ring on central tube 9, once chosen, is not changed or not significantly so during its insertion into the protecting tube, pipe conduit or the like.

Figure 3A:
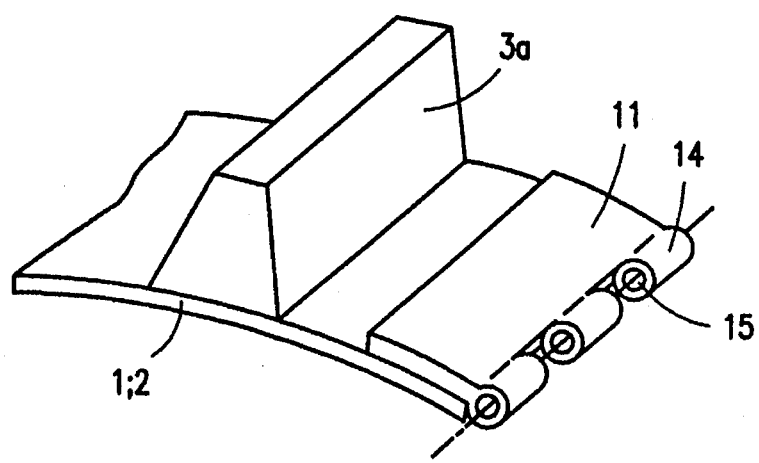
FIGS. 3a, 3b and 3c are detail views, on an enlarged scale, illustrating different closure devices usable in the glide tube rings of FIGS. 1 and 2.
Figure 3B:
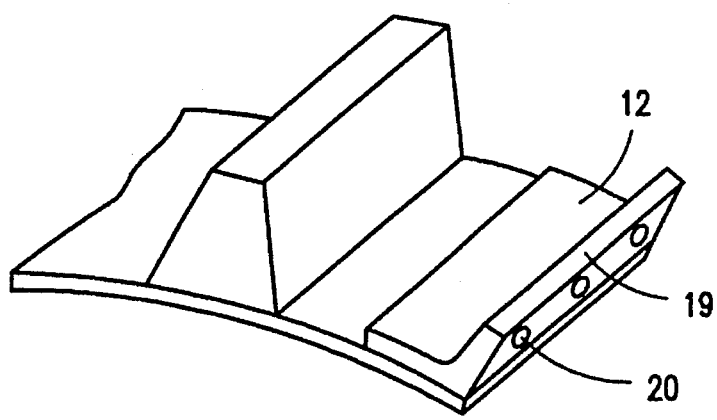
Figure 3C:
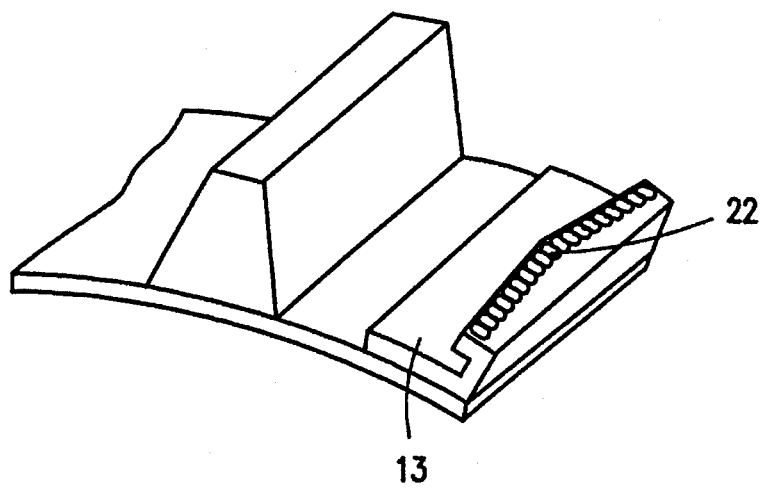

FIG. 3 shows the endless body strip 8 provided with ribs 3 or support slats 3a, which is wound into a roll 7 for storage purposes. If glide tube rings are now required for a central tube 9 with a defined outside diameter, which is to be inserted into a protecting tube with known inside diameter, the procedure is as follows:

a) The central tube is to be provided with one-part glide tube rings. As many sections 6 as glide tube rings are required are unwound from stored roll 7 and cut off. For this purpose the outside periphery of central tube 9 is determined and this quantity reduced by the aforementioned value X; length $L_1$ is obtained. As many sections 6 as one-part glide tube rings are required are unwound from roll 7 with length $L_1$ and cut off.

b) The central tube is to be provided with glide tube rings that consist of two, three or more segments. The outside periphery of the central tube is determined and divided by the number of segments per glide tube ring and reduced by value Y; value $L_2$ is obtained. As many sections 10 as body segments 2a are required with length $L_2$ are unwound from roll 7 and cut off to produce the required number of two-, three- or multipart glide tube rings.

The sections 6, 10 so obtained are now fabricated each with two congruent closures 11, 12 or 13 according to FIGS. 4a, 4b and c, or differently configured closures.

If glide tube rings whose glides have a ridge height corresponding to the value $D+H_1$ are required for insertion of the central tube in the protecting tube, a roll 7 is chosen whose body strip 8 is provided with support slats 3a that preferably consist of a plastic with the lowest possible friction coefficient. However, if glide tube rings with higher ridge height are required, the already described body strip 8 with the support slats 3a fastened to it can be used, but also a body strip 8 whose ribs 3 are molded onto body 1, 2 or molded into it, optionally with inclusion of stiffening profile rods 5. Glide shoes 4 with the required ridge height H are mounted on ribs 3 or support slats 3a of the one-part glide tube rings or body segments 2a fabricated with closures 11, 12 or 13 and joined, especially undetachably to ribs 3 or support slats 3a. This can occur in the following fashion:

c) The glide shoes 4 are made from a plastic having the greatest possible recovery. Such glide shoes 4 are preferably provided with a recess 4a whose shape and size is congruent to ribs 3 or support slats 3a, but smaller by a predetermined amount. The recess 4a of glide shoe 4 is now widened mechanically and/or thermally so that the glide shoe 4 with its recess 4a can be easily mounted onto ribs 3 or support slats 3a; the recesses 4a regain their original dimensions and thus shrink undetachably onto ribs 3 or support slats 4a (FIG. 12a).

d) The ribs 3 or support slats 3a are provided with openings 31 into which expansion anchors 30, which are arranged in the recesses 4a of glide shoe 4, interlock (FIG. 12b). The expansion anchors 30 can be produced either simultaneously with glide shoes 4 and form a single whole with them, or they are produced in their own device and inserted into openings 32 provided in the recesses 4a of glide shoe 4 (FIG. 12c). In the latter case the expansion anchors 30 are undetachably fixed in the openings 32 of recesses 4a either by exploiting the memory effect described under 3.c, or the expansion anchor 30 is provided with a coating 24a in its upper part and joined, especially undetachably, to it with application of heat and/or pressure, optionally with coemployment of an adhesion promoter, inserted into opening 32 of recess 4a with the part characterized by coating 24a and fastened here, possibly with renewed heat supply and/or pressure, optionally with coemployment of an adhesion promoter.

e) The surface of ribs 3 or that of support slats 3a is provided with a coating 24a and joined to it, preferably with application of heat and/or pressure, especially undetachably, optionally with coemployment of an adhesion promoter, a vulcanization accelerator, an activator or the like. The glide shoes 4 are mounted via their recesses 4a onto the ribs 3 or support slats 3a so prepared and joined to them undetachably via coating 24a with possible renewed heat supply and/or pressure.

The aforementioned methods can also be combined according to the invention.

Figure 4:
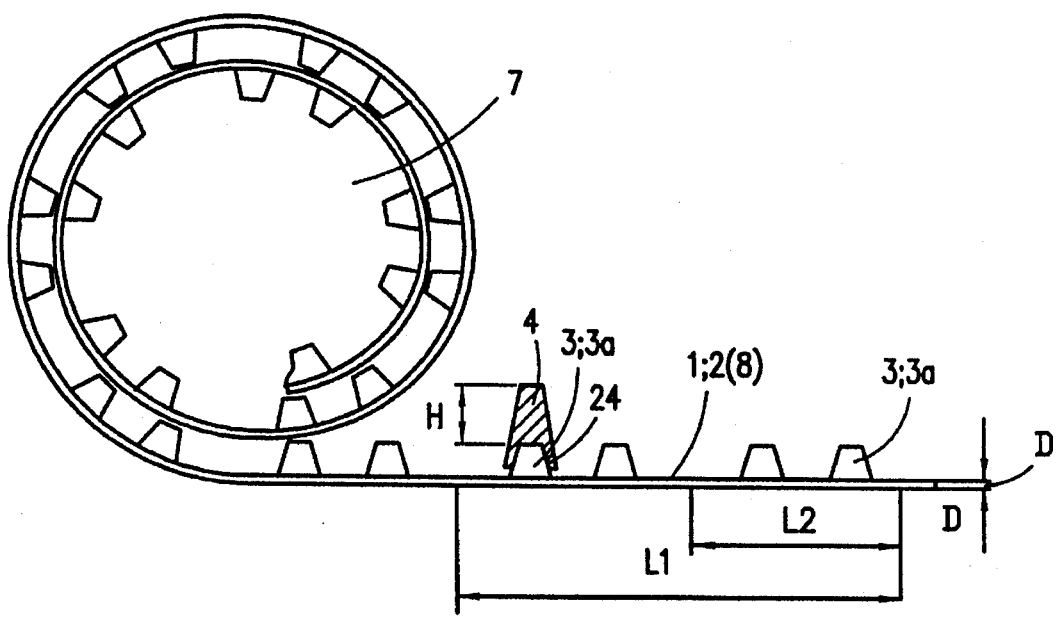
FIGS. 4, 5 and 6 are elevation views of portions of plural segment glide tube rings using the closure devices of FIGS. 3a, 3b and 3c, respectively.

FIG. 4 shows three possible closure or connection pieces 11, 12 and 13; differently configured connection and closures are also conceivable. The connection or closure 11 (FIG. 4a) has already been described at length under FIG. 1. The connection or closure 12 has a screw slat 19 with two, three or more openings 20 that can be penetrated by screws 21. The screw slats 19 are formed so that they lie in the installed state outside of the support surface of the central tube. In a one-part glide tube ring the screw slats 19 with the screws 21 penetrating their openings 20 with the corresponding nuts 21a form the only closure via which the one-part glide tube ring is attached to the central tube under tensile stress.

In a glide tube ring assembled from two, three or more body segments 2a the screw slats 19 of two neighboring body segments 2a each form a closure through which a segment strip 26a is formed that is loosely placed around the central tube and closed into a glide tube ring by forming the last two screw slats 19 into a closure still not connected together by the corresponding screws 21 and nuts 21a, and the glide tube ring can be attached to the central tube under tensile stress by uniform tightening of all screws 21 (FIG. 4b).

Wedge slats 22 of connection or closure 13 can also be used instead of screw slats 19, in which case two facing wedges in each case produce the connection or closure (FIG. 4c).

Figure 5:
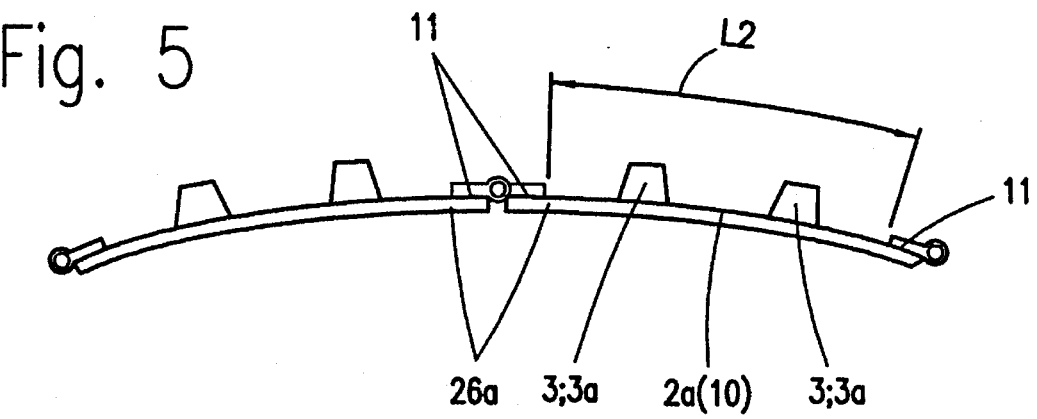
Figure 6:
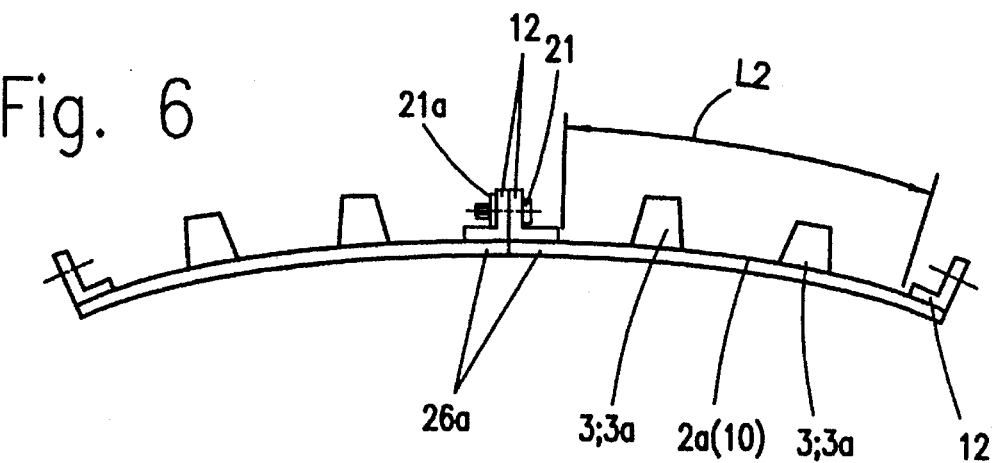
Figure 7:
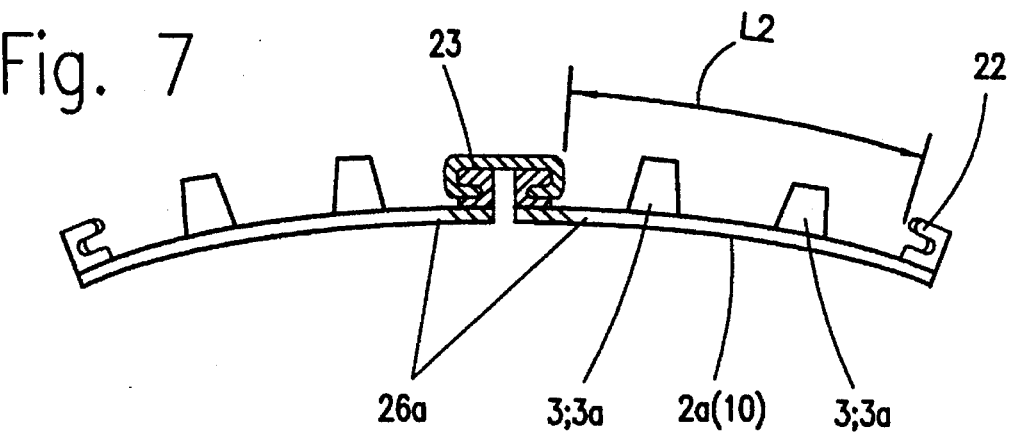
FIG. 7 is a schematic elevation view used to describe and illustrate one method of manufacture according to the invention.

FIGS. 5, 6 and 7 show the already described closures 11, 12 and 13 as connection pieces in segment strips 26a assembled from two, three or more, rubber-elastic body segments 2a.

Figure 8:
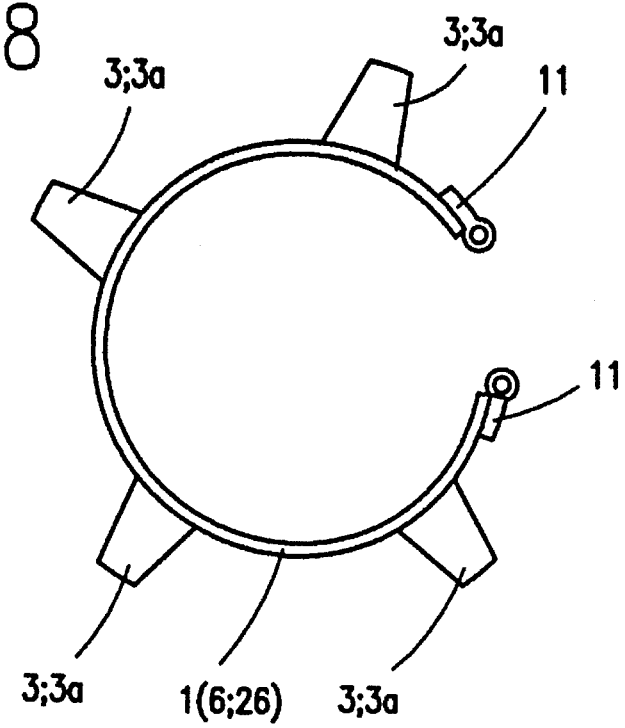
FIG. 8 is a side elevation view of a single-segment glide tube ring constructed in accordance with the invention.

FIG. 8 shows a segment strip 26a consisting of three body segments 2a with allocated closure or connection pieces 11, in which each rubber-elastic body segment 2a has only one rib 3 or only one support slat 3a; glide shoes 4 can be mounted undetachably according to requirements as already described. The hinged, rubber-elastic segment strip is positioned around central tube 9 at the construction site on the location prescribed for it and closed into a three-part glide tube ring by bringing together the still unconnected closures 11, utilizing the stretchability of the rubber-elastic body segments 2a and producing the closure (shown in FIGS. 1 and 2) by means of a rod (not shown) so that the now closed glide tube ring is attached to central tube 9 under tensile stress.

Figure 9:
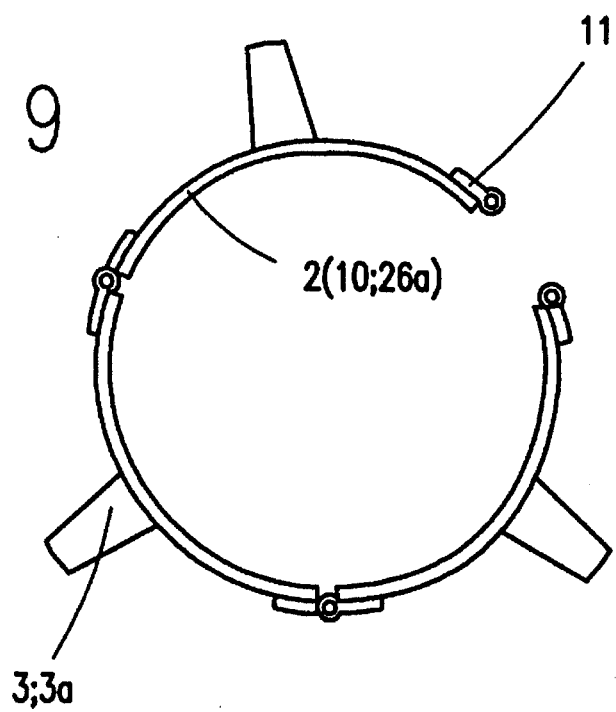
FIG. 9 is a side elevation view of a plural segment glide tube ring similar to that of FIG. 8.

FIG. 9 shows the same situation in a one-part body 1 that is formed into a body strip 26 by congruent closures on its two ends. Here again the one-part body strip 26 is placed around central tube 9 at the construction site on the location prescribed for it and the now closed, one-part glide tube ring fastened to central tube 9 under tensile stress by connecting the two closures 11 by means of a rod 17 not shown (FIGS. 1 and 2).

Figure 10:
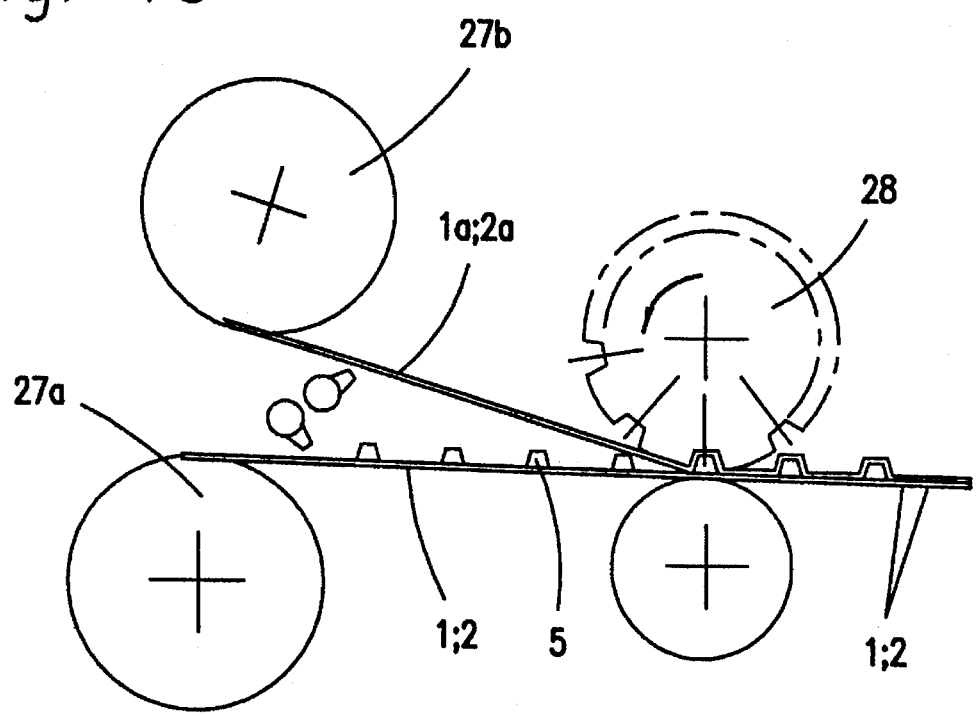
FIG. 10 is a schematic elevation view used to describe and illustrate a further method of manufacture according to the invention.

FIG. 10 shows a possible process with the corresponding device for producing an endless, rubber-elastic body strip 8a with stiffened, molded ribs 3. A rubber-elastic, endless body 1 is unwound from a supply roll 27a and fed to a calender 28, in which the top of the body 1 is heated and profile rods 5 are fastened at a defined spacing from each other on the surface so prepared. Another rubber-elastic body 2 is unwound from a second supply roll 27b, heated on its bottom and brought together with body 1 carrying the profile rods 5 in calender 28 so that the two bodies 1, 2 are joined, with possible renewed heat supply and/or pressure, optionally with coemployment of an adhesion promoter, a vulcanization accelerator, an activator or the like, with one-sided formation of ribs 3 stiffened by profile rods 5, preferably undetachably, into a two-layered, rubber-elastic body strip 8a provided with ribs 3 of defined size and arrangement, which is wound into a roll 7 for storage purposes. The calender 28 is formed from a sizing roll 28a and at least one nip roll 28b and the sizing roll 28a is provided on its periphery with the recesses 34 corresponding to the ribs 3 to be formed. An adjustment device (not shown) is allocated to at least one roll 28a, 28b to set the gap width between the two rolls, through which any required pressure can also be established.

FIG. 11 shows a section of a body strip 8b consisting of layers A, B and C, to which support slats 3a of defined size and shape are attached at defined spacing on the top of layer A. Attachment of the support slats 3a can occur as follows:

f) The bottom of support slats 3a is laminated with a preferably thin coating 24a using heat and pressure, optionally with coemployment of an adhesion promoter, a vulcanization accelerator, an activator or the like, incorporated and, as required, attached to the endless, rubber-elastic body strip, if necessary with renewed heat supply and/or pressure, optionally with coemployment of an adhesion promoter, vulcanization accelerator, an activator or the like.

g) A comparatively thin coating 24a is laminated onto the top of layer A using heat and/or pressure, optionally with coemployment of an adhesion promoter, a vulcanization accelerator, an activator or the like over the entire surface, partially, in the fashion of a herringbone pattern, a diamond pattern or the like and the support slats 3a are mounted at defined spacing on this coating 24a and joined, especially undetachably, to layer A under pressure, as well as possibly renewed heat supply, optionally with coemployment of an adhesion promoter, a vulcanization accelerator, an activator or the like.

Figure 13:
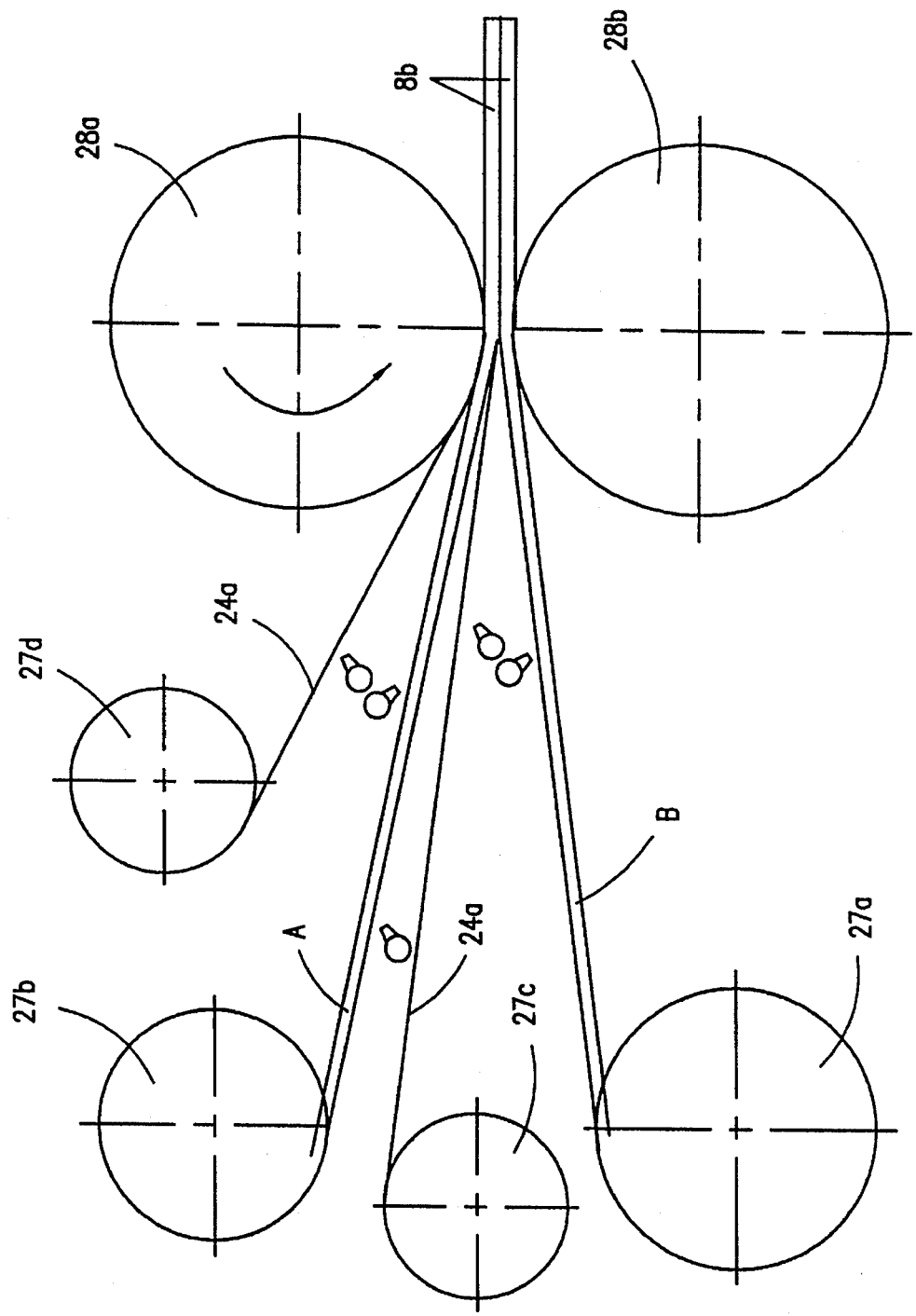
FIG. 13 is a schematic elevation view, similar to FIG. 10, of another manufacturing method according to the invention.

In both cases the layer C can be replaced by the relatively thin coating 24a. As shown in FIG. 13, a device for producing this multilayered body strip 8b according to the invention can also consist of a calender 28 with the two pressure rolls 28a and 28b, to which layers A and B are supplied from supply rolls 27a and 27b. The layers A, B are heated on the bottom or top by appropriate heat sources, for example, hot air. A strip-like or tire-like coating 25a is withdrawn from supply roll 27c, optionally heated on its top and/or bottom by appropriate heat sources, for example, hot air, and also supplied to calender 28 so that the coating 24a is arranged between layers A and B and joined to it under pressure, optionally with renewed heat supply, if necessary with coemployment of an adhesion promoter, a vulcanization accelerator, an activator or the like, preferably undetachably, into a two- or multilayered body strip 8b.

To implement the idea of the invention according to FIG. 11 and g) a relatively thin additional coating 24a (dashed line) can be unwound from supply roll 27d and fed to calender 28 during heating of its bottom so that it is laminated onto layer A under pressure in the calender, optionally with coemployment of an adhesion promoter, a vulcanization accelerator, an activator or the like, if necessary with renewed heat supply.

Additional embodiments of the invention can be gleaned from the patent claims.

We claim:

1. A glide tube ring for a tube-in-tube system in which the glide tube ring guides a conduit tube within a larger protecting tube, the glide tube ring comprising:

an elastic, flexible, stretchable and recoverable strip-like rubber-elastic glide ring body;

first and second closures, mounted on opposite ends of the strip-like body, engageable with each other to join the ends of the strip-like body to each other with the strip-like body fitting closely around the conduit tube;

and a plurality of spaced parallel plastic guides, each formed of a plastic selected from the group consisting of fiber-filled polyethylene, polyamide and polyester plastics, and each projecting radially outwardly of the back of the glide ring body into engagement with the protecting tube, the guides having a low coefficient of friction.

2. A glide tube ring for a tube-in-tube system in which the glide tube ring guides a conduit tube within a larger protecting tube, the glide tube ring comprising:

an elastic, flexible, stretchable and recoverable strip-like rubber-elastic glide ring body;

first and second closures, mounted on opposite ends of the strip-like body, engageable with each other to join the ends of the strip-like body to each other with the strip-like body fitting closely around the conduit tube;

a plurality of spaced plastic guides projecting radially outwardly of the back of the glide ring body into engagement with the protecting tube, the guides having a low coefficient of friction; and a plurality of guide shoes, one mounted undetachably on each plastic guide, each guide shoe engaging the protecting tube, the guide shoes having a low coefficient of friction.

3. A glide tube ring, according to claim 2, in which each guide shoe is mechanically connected to its associated guide.

4. A glide tube ring for a tube-in-tube system in which the glide tube ring guides a conduit tube within a larger protecting tube, the glide tube ring comprising:

an elastic, flexible, stretchable and recoverable strip-like rubber-elastic glide ring body, formed of a plurality of layers bonded to each other, each layer formed of a material having a high coefficient of friction;

first and second closures, mounted on opposite ends of the strip-like body, engageable with each other to join the ends of the strip-like body to each other with the strip-like body fitting closely around the conduit tube;

and a plurality of spaced plastic guides projecting radially outwardly of the back of the glide ring body into engagement with the protecting tube, the guides having a low coefficient of friction.

5. A glide tube ring, according to claim 4, in which the layers are bonded together by vulcanizing.

6. A glide tube ring, according to claim 4, in which the layers are bonded together by welding.

7. A glide tube ring, according to claim 4, in which the layers of the glide tube ring body all have approximately the same linear expansion coefficient.

8. A glide tube ring, according to claim 4, in which the glide ring body includes an odd number of superimposed layers and the middle layer has the lowest coefficient of expansion.

9. A glide tube ring, according to claim 4, in which the glides are of the same material as the outer layer of the glide ring body and are molded integrally therewith in a unified whole.

10. A glide tube ring, according to claim 4, and further comprising a plurality of guide shoes, one mounted on each plastic guide, each guide shoe engaging the protecting tube, the guide shoes having a low coefficient of friction.

11. A glide tube ring for tube-in-tube system in which the glide tube ring guides a conduit tube within a larger protecting tube, the glide tube ring comprising:

an elastic, flexible, stretchable and recoverable strip-like rubber-elastic glide ring body;

first and second closures, mounted on opposite ends of the strip-like body, engageable with each other to join the ends of the strip-like body to each other with the strip-like body fitting closely around the conduit tube;

and a plurality of spaced plastic guides projecting radially outwardly of the back of the glide ring body into engagement with the protecting tube, the guides having a low coefficient of friction, each guide including an internal, integral stiffener.

12. A glide tube ring, according to claim 11, in which each stiffener is formed of a fiberglass reinforced plastic.

* * * * *